Aug. 6, 1968  D. BRAUN ET AL  3,395,595
CUTTER DEVICE WITH COMPENSATION FOR WEAR OF THE CUTTING EDGE
Filed July 15, 1965                             2 Sheets-Sheet 1
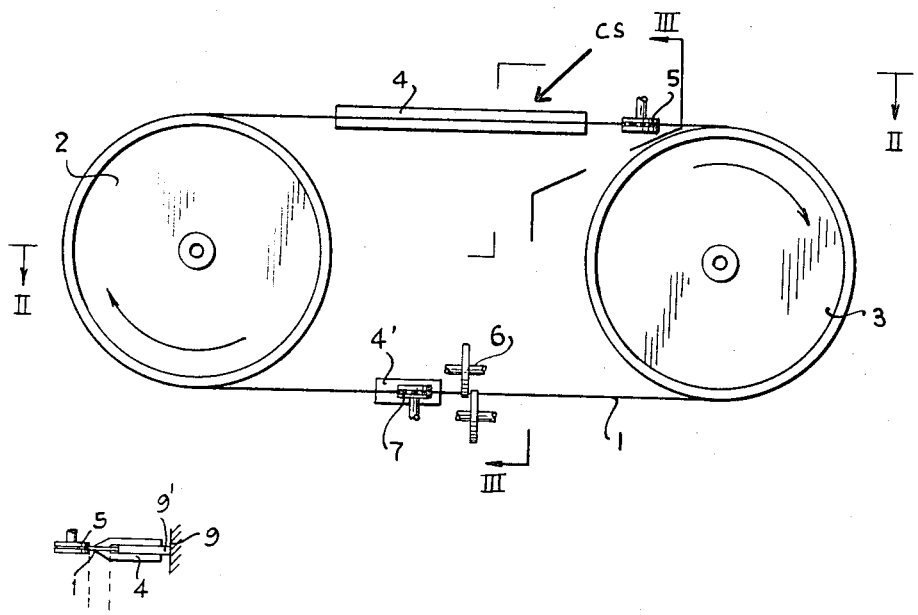
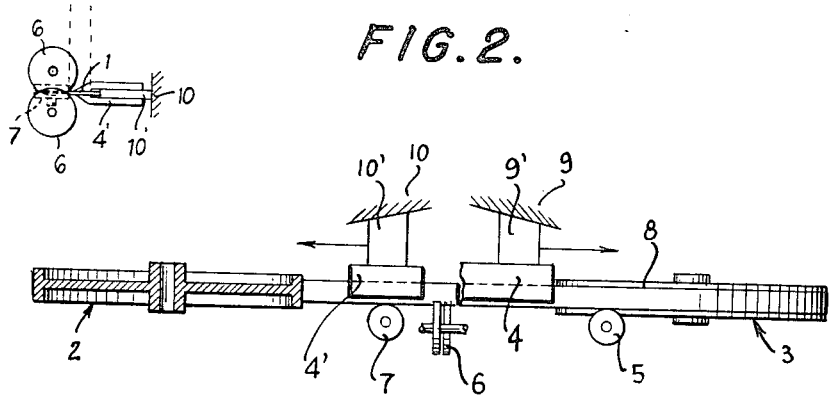
INVENTORS
Dieter Braun
Klaus Rüdiger
BY
Michael J. Striker Aug. 6, 1968  D. BRAUN ET AL  3,395,595
CUTTER DEVICE WITH COMPENSATION FOR WEAR OF THE CUTTING EDGE
Filed July 15, 1965

INVENTORS
Dieter Braun
Klaus Rödiger
BY Michael S. Striker

United States Patent Office 3,395,595
Patented Aug. 6, 1968

3,395,595
CUTTING DEVICE WITH COMPENSATION FOR WEAR OF THE CUTTING EDGE
Dieter Braun, Doffinger, Wurttemberg, and Klaus Rüdinger, Stuttgart-Rot, Germany, assignors to Fortuna-Werke Spezialmaschinenfabrik AG., Stuttgart-Bad Cannstatt, Germany
Filed July 15, 1965, Ser. No. 472,368
Claims priority, application Germany, July 17, 1964, F 43,464
10 Claims. (Cl. 83—174)

ABSTRACT OF THE DISCLOSURE

Two spaced apart rotary carriers have a band-type cutting member trained therearound. The cutting member has a cutting edge and a rear edge located oppositely the cutting edge. Means is provided for biasing the cutting member in lateral directions transversely of the direction in which it travels around the rotary carriers so as to maintain the cutting edge in a predetermined plane. Stop means opposes the biasing means so as to limit the extent to which the cutting member can move laterally under the influence of the biasing means.

---

Figure 4:
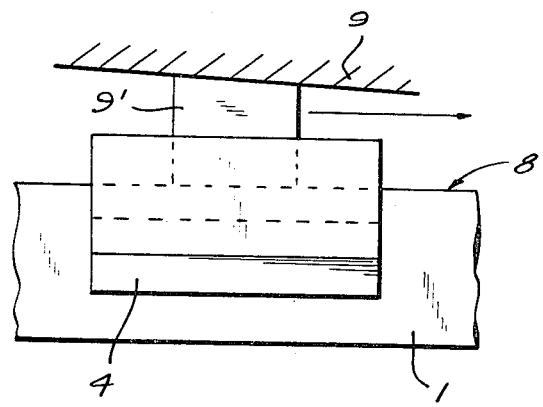

The present invention relates to a cutting device. More specifically, the invention relates to a cutting device which utilizes belt-type knives or cutters which are entrained by spaced-apart rotary carriers. Still more specifically, the present invention relates to a cutting device of the type set forth in which wearing-down of the cutting edge of the cutter is automatically compensated for.

In cutting devices of the type employing cutters which are endless belts entrained by spaced-apart rotary carriers the cutting edge of the cutter must be located in a given plane so as to cut the material fed against the cutter. However, the cutting edge of such cutters will of course wear off, and generally in an uneven pattern. It has been a source of constant problems to attempt maintaining the constantly receding edge in the given plane, in which alone it will perform its proper cutting function.

This problem has been particularly serious in cutting devices of this type which are used for splitting leather and similar materials into separate layers. It is of particular importance, when splitting such materials, that the cut be extremely accurate and clean in view of the further surface treatments to which the split layers are subjected.

Attempts have been made to overcome the above-outlined problem by providing cutting devices of the type indicated in which the belt-type cutter was guided by suitable guide members arranged intermediate the spaced-apart rotary carriers ahead of the cutting station. However, in such devices the cutter was not also guided at the other side of the carriers, that is on its return run. Since the grinding device for resharpening the cutting edge of the cutter was located at the side of the return run, and since no guidance was provided for the cutter on that side, the cutter wobbled on that side and the grinding which took place was very uneven, and in fact left the cutting edge with a series of wavy indentations in the direction towards the back edge of the cutter.

Of course, this represented no effective solution to the difficulties encountered with such cutting devices, and the search for a proper solution has been going on.

It is therefore a general object of the present invention to overcome the above-outlined problems.

A more specific object of the present invention is to provide a cutting device as outlined herebefore in which the cutting edge is automatically maintained in a given plane, irrespective of wearing-off of the cutting edge.

A still more specific object of the present invention is to provide a cutting device of the type described in which the cutting edge will always be ground exactly parallel to the rear edge of the cutter, so that the formation of wavy indentations in the cutting edge is eliminated.

In accordance with one object of our invention we provide a cutting device, comprising:

(a) A pair of spaced rotary carriers;
(b) A belt-type cutter trained around said carriers for advancing lengthwise when said carriers rotate, said cutter having a cutting edge and a rear edge and
(c) A pair of belt portions extending between said carriers and traveling in opposite direction;
(d) Means for biasing said cutter in lateral direction transversely of its travel for maintaining said cutting edge in a predetermined plane despite wearing-away of said cutting edge;
(e) Stop means opposite the biasing means for limiting the extent of lateral movement of said cutter;
(f) And grinder means adjacent said stop means for sharpening said cutting edge as the same becomes worn.

Figure 5:
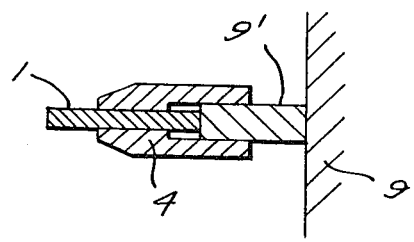

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic view, in side elevation, of a cutting device in accordance with the present invention; and
FIG. 2 is a section taken on the line II—II of FIG. 1;
FIG. 3 is a section taken on the line III—III of FIG. 1 so as to show the device still more clearly;
FIG. 4 is a detail view of FIG. 2; and
FIG. 5 is a sectional detail of FIG. 3 on an enlarged scale.

As shown in FIG. 1 an endless cutter 1 is placed around two rotary carriers, such as the drums 2 and 3. Although no drive means are shown in the drawing it will be apparent that one or both of these drums 2, 3 will be driven whereby the cutter 1 is caused to travel lengthwise and advance in the direction of the arrows shown on the drums. A guide means 4 surrounds a portion of the cutter 1 intermediate the drums 2 and 3 immediately at the cutting station indicated with the symbol CS. Directly beyond the cutting station CS in direction of the travel of cutter 1 there is located a guide member 5, which in the present instance is a guide roller. At the side of the return run of cutter 1 there is arranged a grinding device 6 which may be of any well-known design, and in the illustration comprises two grinding wheels located on opposite sides of the cutting edge of cutter 1. Immediately beyond grinding device 6 in direction of travel of cutter 1 there is located another guide member, indicated with reference numeral 7 and in the present embodiment also constructed as a guide roller.

As is evident from FIGS. 2 and 3 a biasing means cooperates with the guide means 4 and engages the rear edge of cutter 1. This biasing means comprises a stationary guideway 9 which is inclined toward the back 8 of cutter 1 in the direction of travel of the cutter. A wedge 9' engages with a complementarily inclined surface the stationary guideway 9 on which it is slidable in the direction of the associated arrow (see FIG. 2), and with another surface the guides means 4 and biases the rear edge 8 of cutter 1, transversely of the direction of advancement of the latter, that is in the direction of the cutting edge. Thus, as the cutting edge becomes worn away at the cutting station CS, it will always be biased towards the material-to-be-cut by the wedge action of the biasing means 9, 9', the latter being entrained for movement in the direction of its associated arrow by the frictional force which develops from its engagement with the rear edge 8 of cutter 1 (compare FIGS. 3–5). To prevent excessive biasing, that is movement of the cutting edge beyond the predetermined cutting plane, the guide roller 5 engages the cutting edge of cutter 1 in the direction oppositely the biasing action. Thus, the biasing means 9, 9' can cause transverse movement of cutter 1 only as the cutting edge wears away and begins to lose contact with the guide roller 5. The cutter 1 is then biased in the direction towards the guide roller 5 by that distance by which the cutting edge has receded as a result of being worn off.

Immediately adjacent to and in the direction of travel of cutter 1 beyond the grinder 6, there is provided on the side of the cutting edge a similar guide roller 7. At this point there is provided a support means or a second biasing means which comprises again a stationary way 10 which is inclined to the cutter 1 in the direction of travel of the same, and a wedge 10' which engages the way 10 on the one hand and the rear edge 8 of cutter 7 on the other, thus again causing biasing of the cutting edge into contact with the guide roller 7. Of course, it will be understood that both of the guide rollers 5 and 7 may be made adjustable transversely of the direction of travel of cutter 1 to permit setting of the cutting edge at various positions. However, both rollers are stationary in respect to the direction of travel of cutter 1. Since it has been found from experience that there will be little, if any, sliding of cutter 1 on the drums 2 and 3, the provision of the biasing means 10, 10' in co-operation with the guide roller 7 on the one hand, and the frictional engagement of cutter 1 with drum 2 and 3 on the other assure that the cutter will be properly held at the point at which grinding device 6 sharpens the cutting edge. This reliably prevents wobbling of the cutter 1 and thus assures that the cutting edge is always honed exactly parallel to the rear edge of the cutter, rather than being given a series of wave-like indentations extending from the cutting edge inwards towards the rear edge 8 of the cutter. The result is a cutting edge which is smooth and straight, and which permits clean and efficient splitting of the leather or other similar material.

It should also be pointed out that this arrangement not only permits the clean cutting action by locating the cutting edge always in the predetermined cutting plane and by eliminating the formation of wavy indentations in the cutting edge, but that it also results in an increased useful lifespan for the cutter 1, in that the same is constantly formed with a new cutting edge and the cutting edge constantly recedes in the direction of the rear edge 8 of cutter 1 exactly parallel to said rear edge. This means that the formation of new cutting edges can proceed until the maximum permissible amount of material has been removed from the cutter 1 in the direction transversely of its elongation.

It will be understood that each of the elements described above, or two or more together, may also find a useful application in other types of cutting devices differing from the types described above.

While the invention has been illustrated and described as embodied in a cutting device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A cutting device, comprising a pair of spaced rotary carriers; a band-type cutter trained around said carriers for advancing lengthwise when said carriers rotate, said cutter having a cutting edge and a rear edge and a pair of band portions extending between said carriers and traveling in opposite directions; means for biasing said cutter in lateral direction transversely of its travel for maintaining said cutting edge in a predetermined plane despite wearing-away of said cutting edge; stop means opposite the biasing means for limiting the extent of lateral movement of said cutter; and grinding means adjacent said stop means for sharpening said cutting edge as the same becomes worn.

2. A cutting device, comprising a pair of spaced rotary carriers; a band-type cutter trained around said carriers for advancing lengthwise when said carriers rotate, said cutter having a cutting edge and a rear edge and a pair of band portions extending between said carriers and traveling in opposite directions; self-adjusting biasing means for biasing said cutter in lateral direction transversely of its travel for maintaining said cutting edge in a predetermined plane despite wearing-away of said cutting edge; stop means opposite the biasing means for limiting the extent of lateral movement of said cutter; and grinding means adjacent said stop means for sharpening said cutting edge as the same becomes worn.

3. A cutting device, comprising a pair of spaced rotary carriers; a band-type cutter trained around said carriers for advancing lengthwise when said carriers rotate, said cutter having a cutting edge and a rear edge and a pair of band portions extending between said carriers and traveling in opposite directions; self-adjusting biasing means engaging said rear edge of said cutter for biasing said cutter in lateral direction transversely of its travel for maintaining said cutting edge in a predetermined plane despite wearing-away of said cutting edge; stop means opposite the biasing means for limiting the extent of lateral movement of said cutter; and grinding means adjacent said stop means for sharpening said cutting edge as the same becomes worn.

4. A cutting device, comprising a pair of spaced rotary carriers; a band-type cutter trained around said carriers for advancing lengthwise when said carriers rotate, said cutter having a cutting edge and a rear edge and a pair of band portions extending between said carriers and traveling in opposite directions; self-adjusting biasing means engaging said rear edge of said cutter for biasing said cutter in lateral direction tranversely of its travel for maintaining said cutting edge in a predetermined plane despite wearing-away of said cutting edge; stop means arranged opposite the biasing means and engaging said cutting edge for limiting the extent of lateral movement of said cutter; and grinding means adjacent said stop means for sharpening said cutting edge as the same becomes worn.

5. A cutting device, comprising a pair of spaced rotary carriers; a band-type cutter trained around said carriers for advancing lengthwise when said carriers rotate, said cutter having a cutting edge and a rear edge and a pair of band portions extending between said carriers and traveling in opposite directions; self-adjusting biasing means engaging said rear edge of said cutter for biasing said cutter in lateral direction transversely of its travel for maintaining said cutting edge in a predetermined plane despite wearing-away of said cutting edge; stop means arranged opposite the biasing means and engaging said cutting edge for limiting the extent of lateral movement of said cutter; and grinding means adjacent said stop means and engaging said cutting edge from opposite sides thereof for sharpening said cutting edge as the same becomes worn.

6. A cutting device, comprising a pair of spaced rotary carriers; a band-type cutter trained around said carriers for advancing lengthwise when said carriers rotate, said cutter having a cutting edge and a rear edge and a pair of band portions extending between said carriers and traveling in opposite directions; self-adjusting biasing means engaging one of said band-portions for biasing the same in lateral direction transversely of the travel of said cutter for maintaining said cutting edge in a predetermined plane despite wearing-away of said cutting edge; stop means opposite said biasing means for limiting the extent of lateral movement of said cutter; and grinding means adjacent said stop means for sharpening said cutting edge as the same becomes worn.

7. A cutting device, comprising a pair of spaced rotary carriers; a band-type cutter trained around said carriers for advancing lengthwise when said carriers rotate, said cutter having a cutting edge and a rear edge and a pair of band portions extending between said carriers and traveling in opposite directions; self-adjusting biasing means engaging one of said band portions for biasing the same in lateral direction transversely of the travel of said cutter for maintaining said cutting edge in a predetermined plane despite wearing-away of said cutting edge; first stop means opposite said biasing means for limiting the extent of lateral movement of said cutter; support means engaging the other of said band portions; second stop means arranged oppositely said support means and cooperating therewith for preventing lateral movement of said other of said band portions in the region of said other band portions and grinding means adjacent said stop means for sharpening said cutting edge as the same becomes worn.

8. A cutting device as set forth in claim 7, wherein said second stop means are rotary members, and wherein the respective axes of said rotary members extend in a common plane passing through said axes in longitudinal direction thereof.

9. A cutting device as set forth in claim 7, wherein said self-adjusting biasing means and said support means each comprise a stationary guide way respectively inclined towards said cutter in the direction of travel of the respective band portion, and a wedge-like biasing member received intermediate the respective guide way and band portion for biasing the band portion in the direction toward the respective stop means so that, as the cutting edge of said cutter is worn away, the biasing action of said biasing means and support means will continuously maintain the new cutting edge, continuously being formed by said grinding means, in said predetermined plane.

10. In a cutting device for spliting leather and like materials, an arrangement for honing a cutting-edge of a band-type cutter entrained by two spaced-apart rotary carriers exactly parallel to a rear edge of the cutter, independently of width of the cutter and degree of wear of the cutting edge, said arrangement comprising a first guide roller arranged in the working run of said cutter immediately adhead of one of said rotary carriers for guiding said cutter; grinding means for grinding the cutting edge of said cutter and arranged in the return run of said cutter; a second guide roller arranged immediately behind said grinding means in direction of travel of said cutter and engaging the just ground cutting edge; and biasing means for biasing said cutting edge towards said guide rollers transversely of the direction of movement of said cutter, and in response to wearing-away and receding of said cutting edge in direction toward said rear edge of the cutter.

References Cited
UNITED STATES PATENTS 596,440 12/1897 Barton _____ 83—174 X
2,532,398 12/1950 Fehlmann _____ 143—157 X JAMES M. MEISTER, *Primary Examiner.*